(12) United States Patent
Kanevsky et al.

(10) Patent No.: US 6,442,519 B1
(45) Date of Patent: Aug. 27, 2002

(54) SPEAKER MODEL ADAPTATION VIA NETWORK OF SIMILAR USERS

(75) Inventors: Dimitri Kanevsky, Ossining, NY (US); Vit V. Libal, Tarnvald; Jan Sedivy, Prague, both of (CZ); Wlodek W. Zadrozny, Tarrytown, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/437,646

(22) Filed: Nov. 10, 1999

(51) Int. Cl.$^7$ .......................... G10L 15/06; G10L 15/14
(52) U.S. Cl. ..................................... 704/243; 704/270.1
(58) Field of Search ................................ 704/243, 244, 704/245, 270, 270.1, 275, 233, 246, 250, 251, 255, 256; 379/88.01, 88.02, 88.03, 88.04

(56) References Cited

U.S. PATENT DOCUMENTS

| | | | | |
|---|---|---|---|---|
| 5,664,058 A | * | 9/1997 | Vysotsky | 704/238 |
| 5,864,807 A | * | 1/1999 | Campbell et al. | 704/244 |
| 5,895,447 A | * | 4/1999 | Ittycheriah et al. | 704/231 |
| 5,897,616 A | * | 4/1999 | Kanevsky et al. | 379/88.02 |
| 5,950,157 A | * | 9/1999 | Heck et al. | 701/234 |
| 6,088,669 A | * | 7/2000 | Maes | 704/231 |
| 6,141,641 A | * | 10/2000 | Hwang et al. | 704/243 |
| 6,163,769 A | * | 12/2000 | Acero et al. | 704/243 |
| 6,182,037 B1 | * | 1/2001 | Maes | 704/245 |
| 6,182,038 B1 | * | 1/2001 | Balakrishnan et al. | 704/250 |
| 6,253,179 B1 | * | 6/2001 | Beigi et al. | 704/243 |
| 6,327,568 B1 | * | 12/2001 | Joost | 704/251 |
| 6,363,348 B1 | * | 3/2002 | Besling et al. | 704/251 |

OTHER PUBLICATIONS

L.R. Bahl, P.V. de Souza, P.S. Gopalakrishnan, D. Nahamoo, M. Picheny, Decision Trees for Phonological Rules in Continuous Speech, Proceeding of the International Conference on Acoustics, Speech, and Signal Processing, Toronto, Canada, May 1991.

Frederick Jelinek, Statistical Methods for Speech Recognition, , The MIT Press, Cambridge, Jan. 1999, pp. 165–171.

M.J.F. Gales and P.C. Woodland, Means and variance adaptation within the MLLR framework, Computer Speech and Language (1996) 10, 249–264.

Chin–Hui Lee and J.L. Gauvain, Bayesian Adaptive Learning and Map Estimation of HMM, Automatic Speech and Speaker Recognition, 1996 Kluwer Academic Publishers, Boston, pp. 83–105.

(List continued on next page.)

Primary Examiner—Marsha D. Banks-Harold
Assistant Examiner—Martin Lerner
(74) Attorney, Agent, or Firm—Louis J. Percello; Fitch, Even, Tabin & Flannery

(57) ABSTRACT

A speech recognition system, method and program product for recognizing speech input from computer users connected together over a network of computers. Speech recognition computer users on the network are clustered into classes of similar users according their similarities, including characteristics nationality, profession, sex, age, etc. Each computer in the speech recognition network includes at least one user based acoustic model trained for a particular user. The acoustic models include an acoustic model domain, with similar acoustic models being clustered according to an identified domain. User characteristics are collected from databases over the network and from users using the speech recognition system and then, distributed over the network during or after user activities. Existing acoustic models are modified in response to user production activities. As recognition progresses, similar language models among similar users are identified on the network. Update information, including information about user activities and user acoustic model data, is transmitted over the network and identified similar language models are updated. Acoustic models improve for users that are connected over the network as similar users use their respective speech recognition system.

26 Claims, 7 Drawing Sheets

OTHER PUBLICATIONS

Jerome R. Bellegarda, Context–Dependent Vector Clustering for Speech Recognition, Automatic Speech and Speaker Recognition, Kluwer Academic Publishers, Boston, pp. 133–153.

D. Matrouf, M. Adda–Decker, L. Lamel, and J. Gauvain, Language Identification Incorporating Lexical Information, Proceedings of the 1998 International Conference on Spoken Language Processing, ICSLP '98, Sydney, Australia, Dec. 1998, pp. 181–184.

* cited by examiner

SPEAKER MODEL ADAPTATION VIA NETWORK OF SIMILAR USERS

RELATED APPLICATIONS

The present invention is related to U.S. patent application Ser. No. 08/787,031, filed Jan. 28, 1997 entitled "Speaker Recognition Using Thresholded Speaker Class Model Section or Model Adaptation" to Ittycheriah, et al. now issued as U.S. Pat. No. 5,895,447, U.S. patent application Ser. No. 08/788,471, filed Jan. 28, 1997 entitled "Text Independent Speaker Recognition for Transparent Command Ambiguity Resolution and Continuous Access Control" now U.S. Pat. No. 6,073,101 issued Jun. 6, 200, and U.S. patent application Ser. No. 08/787,029, filed Jan. 28, 1997 entitled "Speaker Model Prefetching" both to Stephane Maes now U.S. Pat. No. 6,088,669 issued Jul. 11, 2000, and (Ser. No. 09/422,383) entitled "Language Model Adaptation Via Network of Similar Users" filed Oct. 21, 1999, all assigned to the assignee of the present invention. These patents and patent applications are herein incorporated by reference in their entirety.

BACKGROUND OF THE INVENTION

1. Field of the Invention

The present invention is related to speech recognition and more particularly to speech recognition on multiple connected computer systems connected together over a network.

2. Background Description

Automatic speech recognition (ASR) systems for voice dictation and the like use any of several well known approaches to for word recognition.

For example, L. R. Bahl, P. V. de Souza, P. S. Gopalakrishnan, D. Nahamoo, and M. Picheny, "Robust Methods for Using Context-dependent Features and Models in Continuous Speech Recognizer," *Proceedings of the International Conference on Acoustics, Speech, and Signal Processing*, vol. I, pp. 533–36, Adelaide, 1994, describe an acoustic ranking method useful for speech recognition. Acoustic decision trees, also useful for speech recognition are described by L. R. Bahl, P. V. de Souza, P. S. Gopalakrishnan, D. Nahamoo, and M. Picheny, in "Decision Trees for Phonological Rules in Continuous Speech," *Proceedings of the 1991 International Conference on Acoustic, Speech, and Signal Processing*, Toronto, Canada, May 1991. Frederick Jelinek in *Statistical Methods for Speech Recognition*, The MIT Press, Cambridge, January 1999, describes identifying parameters that control decoding process.

While generally recognizing spoken words with a relatively high degree of accuracy, especially in a single user system, these prior speech recognition systems still, frequently, make inappropriate recognition errors. Generally, for single user systems, these errors can be reduced with additional user specific training. However, additional training time and increased data volume that must be handled during training are undesirable. So, for expediency, recognition accuracy is traded to minimize training time and data.

Speaker independent automatic speech recognition systems, such as what are normally referred to as interactive voice response systems, have a different set of problems, because they are intended to recognize speech from a wide variety of individual speakers. Typically, the approach with speaker independent ASR systems is to improve recognition accuracy by assigning individual speakers or recognition system users to user clusters. User clusters are groups of users with similar speech characteristics or patterns. As each speaker or user uses the system, the speaker is identified as belonging to one cluster. For each user cluster, acoustic prototypes are developed and are used for speech decoding.

For example, speakers may be clustered, according to language or accent. Various techniques for language identification are taught by D. Matrouf, M. Adda-Decker, L. Lamel and J. Gauvain, in "Language Identification Incorporating Lexical Information" in *Proceedings of the 1998 International Conference on Spoken Language Processing* (ICSLP 98), Sydney, Australia, December 1998. A well known method of determining an accent from acoustic features is taught by M. Lincoln, S. Cox and S. Ringland, in "A Comparison of Two Unsupervised Approaches to Accent Identification" *Proceedings of the 1998 International Conference on Spoken Language Processing* (ICSLP 98), Sydney, Australia, December 1998. However, the approach of Lincoln et al., if there is a very large speaker variability, as is normally the case, that variability may not be accounted for in training. Accordingly, speaker clusters that are accumulated in a normal ASR training period, generally, do not provide for all potential ASR users.

Consequently, to provide some improvement over speaker dependent methods, ASR decoding system approaches are used that are based on various adaptation schemes for acoustic models. These recognition adaptation schemes use additional data that is gathered subsequent to training by the ASR system every time a user dictates to the system. The speaker or user, usually, interactively corrects any errors in the recognition result, and those corrected scripts are used for what is normally referred to as a supervised adaptation.

See for example, Jerome R. Bellegarda, in "Context-dependent Vector Clustering for Speech Recognition," in *Automatic Speech and Speaker Recognition*, edited by Chin-Hui Lee, Frank K. Song, 1996, Kluwer academic Publishers, Boston, pp. 133–153 which teaches an adaptation of acoustic prototypes in response to subsequent speech data collected from other users. Also, M. J. F. Gales and P.C. Woodland, "Mean and variance adaptation within the MLLR framework," *Computer Speech and Language* (1996) 10, 249–264 teach incremental adaptation of HMM parameters derived from speech data from additional subsequent users.

The drawback with the above approaches of Bellegarda or Gales et al. is that during typical dictation sessions the user uses a relatively small number of phrases. So, it may take several user sessions to gather sufficient acoustic data to show any significant recognition accuracy improvement using such a supervised adaptation procedure. As might be expected, in the initial sessions the decoding accuracy may be very low, requiring significant interactive error correction.

Further, similar or even worse problems arise in unsupervised ASR applications when users do not correct ASR output. For example, unsupervised ASR is used in voice response systems wherein each user calls in to a service that uses ASR to process user voice input. C.H. Lee and J.L. Gauvain, "Bayesian adaptive Learning and MAP Estimation of HMM", in *Automatic Speech and Speaker Recognition*, edited by Chin-Hui Lee, Frank K. Song, 1996, Kluwer academic Publishers, Boston, pp. 109–132 describe for supervised and unsupervised acoustic model adaptation methods. While it is still possible to adapt speech recognition for any new users using unsupervised adaptation, sufficient data must be collected prior to unsupervised use to insure adequate decoding accuracy for every new user.

Thus, there is a need for increasing the amount of usable acoustic data that are available for speech recognition of individual speakers in supervised and unsupervised speech recognition sessions.

SUMMARY OF THE INVENTION

It is a purpose of the invention to improve speech recognition by computers;

It is yet another purpose of the invention to expand the data available for speech recognition.

The present invention is a speech recognition system, method and program product for recognizing speech input from computer users connected together over a network of computers, each computer including at least one user based acoustic model trained for a particular user. Computer users on the network are clustered into classes of similar users according their similarities, including characteristics nationality, profession, sex, age, etc. Characteristics of users are collected from databases over the network and from users using the speech recognition system and distributed over the networks during or after user activities. As recognition progresses, similar language models among similar users are identified on the network. The acoustic models include an acoustic model domain, with similar acoustic models being clustered according to an identified domain. Existing acoustic models are modified in response to user production activities. Update information, including information about user activities and user acoustic model data, is transmitted over the network. Acoustic models improve for users that are connected over the network as similar users use their respective voice recognition system.

DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
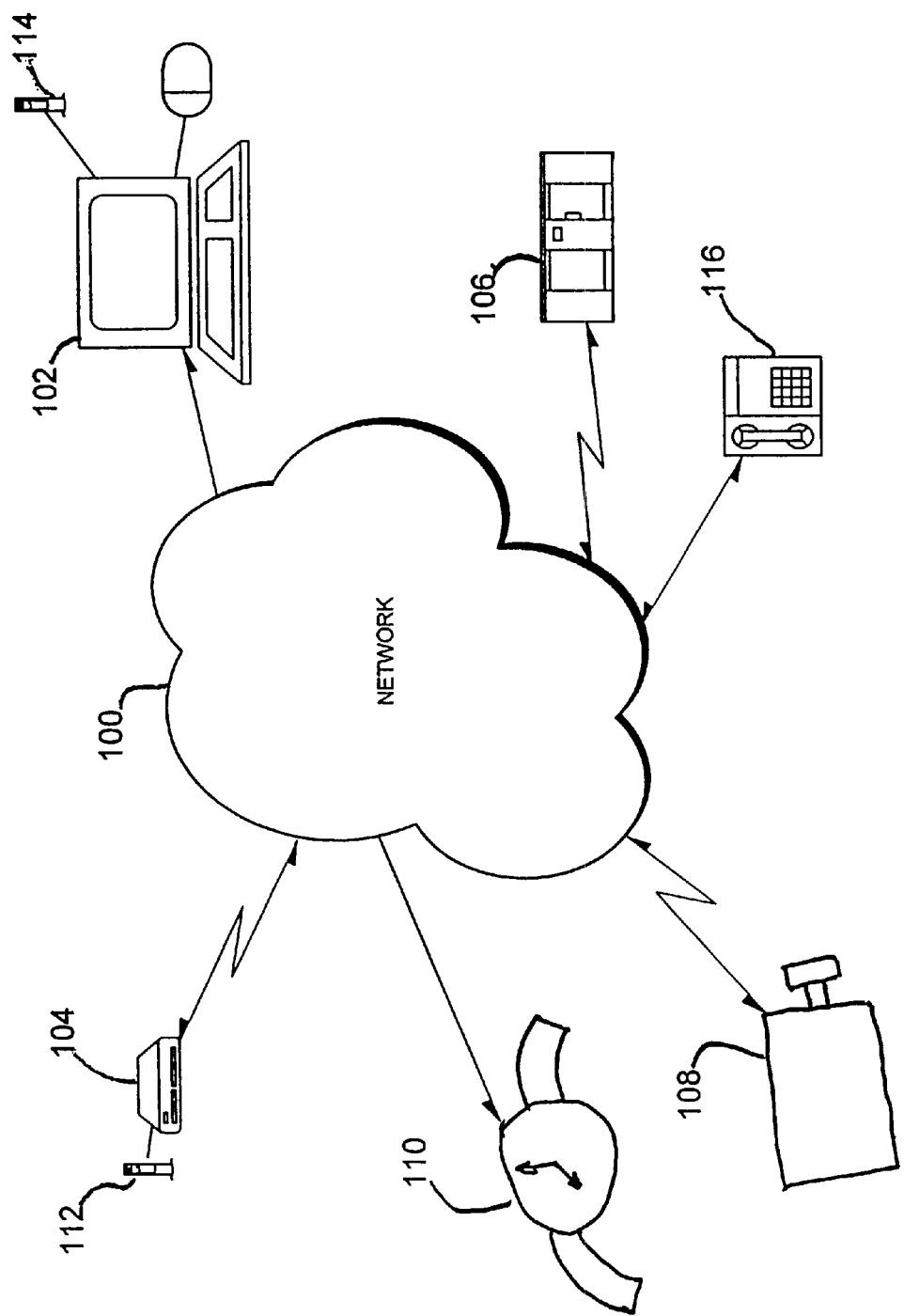
FIG. 1 is a block diagram of users connected together over network using shared acoustic models during user production activities according to the preferred embodiment of the present invention.

Referring now to the drawings and, more particularly, FIG. 1 shows a speech recognition network 100, wherein individual user utterances are analyzed to classify the user, the individual user is clustered with other similar users, and data from similar acoustic models for those clustered users are aggregated to provide an expanded or supplemented acoustic model for recognition of that individual user. Computers 102, 104 and 106 connected to the network 100 are each capable of executing an acoustic model (AM) for some type of speech recognition. Also, speech enabled interface devices 108, 110 with embedded processors or smart controllers may be connected to the network 100. In the preferred embodiment networked system, utterances or speech input may be, for example, for command/menu navigation, dictation or transcription.

Preferably, the speech recognition network 100 is a local area network (LAN) of connected speech recognition computers 102, 104, 106 and speech enabled devices 108, 110. Optionally, the network 100 may be a wide area network (WAN), a connection of computers over what is commonly referred to as the internet or world wide web (www) or over an intranet, an extranet, a radio network or a telephone network, or any combination thereof As shown in FIG. 1, by way of example only, connected computers 102, 104, 106 may include what are commonly referred to as personal computers 102, hand held computers 104, and one or more servers 106. Hand held computers 104 may include what is known as a personal digital assistant (PDA). Connected speech enabled interface devices may include, for example, cameras 108, intelligent watches 110 and connected telephones 116. Further, microphones 112, 114 are shown connected to personal computer 102 and PDA 104 and are integrated into speech enabled interface devices 108, 110 for receiving speech input from a user.

Personal computers 102 also may include an audio capture module that receives audio signals and converts received audio signals into digital signals. Each of the speech recognition computers 102, 104 includes an automatic speech recognition module and a local database containing acoustic models for local users. For speech recognition, each local acoustic model is the direct result of training by a specific local user. Further, a global database is maintained on at least one speech recognition server 106. The global database may include multiple acoustic models for users of connected computers, as well as individual user speech data. Further, as individual user features or characteristics are collected from local user databases in computers 102, 104, the collected features are aggregated in the global databases on servers 106. Interface devices 108, 110 may avail themselves of excess capacity on servers 106, storing local databases on a server 106 and using acoustic models from a server's global database for speech recognition.

The preferred embodiment of the present invention includes a dialog management unit for conducting a conversation with an individual user. An audio capture module coupled to the dialog management unit captures a speech waveform from utterances spoken by the individual user during the conversation. An acoustic front end coupled to the audio capture module is configured to receive and digitize the speech waveform so as to provide a digital waveform, and to extract, from the digital waveform, at least one acoustic feature. The acoustic front end and audio capture module may be, for example, a microphone connected to an analog-to-digital converter located on a sound board in a personal computer or a telephone connected to an automatic interactive voice response (IVR) system. The dialog management unit can include a telephone IVR system that may be, for example, the same automatic IVR system used to implement the audio capture module. Alternatively, the dialog management unit may simply be an acoustic interface to a human operator.

The preferred embodiment system includes at least one processing module coupled to the acoustic front end that analyzes the extracted acoustic features to determine user cluster attributes, i.e., to classify the user or speaker. Each processing module includes a speaker clusterer and classifier. Preferably, the processing module is implemented by the processor of the IVR system. Alternatively, dedicated hardware may be used for the processing module such as an application specific integrated circuit (ASIC) or a separate general purpose computer with appropriate software. The classifier can include a speaker clustering and classification module as well as a speaker classification data base. Cluster user attributes from the processing module are stored in a speaker cluster database stores. A speech adaptation module transmits data to other connected user speech systems. Thus, the present invention is an apparatus for collecting data associated with the voice of a user, which is then supplemented by previously collected data and used for speech recognition for the user.

So, by conducting a conversation with a voice system user, capturing the user's speech waveform and digitizing the speech waveform acoustic features may be extracted from the digitized speech waveform. The extracted features are passed to other connected systems and used to modify the speech recognition systems of similar users clustered in the same user cluster.

Speaker classification may be supervised or unsupervised. For supervised classification, the classes are decided beforehand based on externally provided information. Typically, such classification employs distinctions between male and female, adult versus child, native speakers versus different potential nonnative speakers, and the like. For unsupervised classification there is no advanced user labeling and classes are developed on the fly with the classification information being extracted from data using very little supervision, if any, and with sounds being clustered as classes develop.

Preferably, the processing module includes an accent identifier. The accent identifier includes an accent identification module and an accent data base. The accent identifier is employed for native language identification in a manner equivalent, essentially, to accent classification. Meta information about the identified native language of a speaker provides additional to definition each accent/native language model. A dialect can be determined from the user's accent.

According to the preferred embodiment, a continuous speech recognizor is trained by several speakers with different accents. For accent identification an accent vector is extracted from each individual user's speech and the accent vector is classified. The accent vector is associated with each of the training speakers. Accent vector dimensions represent the most likely component mixture associated with each state of each phoneme or phone. Then, the speakers are clustered based on the distance between corresponding accent vectors, and the clusters are identified by the accent of the member speakers.

For each cluster various types of speech recognition may be employed for speech recognition, which in combination with the particular speech recognition computer 102, 104, 106 determine the form of the individual acoustic models. Thus, individual model types may include what are known as acoustic prototypes, Hidden Markov Models (HMM) modeling words and phonemes or phones, acoustic ranks, acoustic decision trees. The preferred statistical analysis techniques include analysis of parameters such as weighted mixtures of decoding scores, thresholds that control decoding stacks, duration of phones or words, sizes of previously listed decoding alternatives, and/or the size of decoding trees.

Further, each acoustic model is directed to a different speech domain. It is important to distinguish between speech domains, because the particular speech domain deeply influences the resulting speech model. Accordingly, in addition to dictation, the speech domains may include telephone speech, speaker independent speech, gender related speech, age related speech, broadcasting speech, speech partially obscured by noise, speech with music, discrete and continuous speech. Further, speech may be the result of different user production activities such as dictation or conversation that is supplemented by error correction and may be partially obscured by noise or music or by some other type of sound generation. As used herein, user production activities refers to, generally, speech or audio related activities that are intended to produce specific computer related responses.

So, for the networked speech recognition system of the preferred embodiment, as users issue commands, dictate letters, etc., a corresponding local acoustic model on each corresponding user's system, e.g., PDA 104, recognizes the particular user's speech. If the user corrects the results of the recognition, the corrections are stored locally in a local database and used to adjust and refine the local acoustic model. As correction or modifications are made to the local model, the corrections and modifications are passed across the network 100 to the global database on one of the connected recognition servers 106, which in turn distributes the corrections across the network to computers of other clustered similar users.

The preferred processing module also includes a speaker recognizor, which may be the same as the speech recognizor above. The speaker recognizor is a speaker recognition module that includes a speaker prototype model, a language model and a grammar database. Preferably, the speaker recognizor transcribes queries from the user. In one preferred embodiment, the speaker recognizor is a speaker-independent large-vocabulary continuous-speech recognition system. In a second preferred embodiment, the speaker recognizor is a class-dependent large-vocabulary continuous-speech recognition system. Such speech recognition systems are well known in the art. The output of the normal speech recognizor is complete sentences. However, finer granularity also is selectable, e.g., time alignment of the recognized words.

As described hereinabove, the acoustic front end extracts acoustic features that are supplied to the speaker clusterer and classifier, the speaker recognizor and the accent identifier. Preferably, the acoustic front end is an eight-dimension-plus-energy front end, such as are well known in the art. For the preferred front end, the speech spectrum is divided into cepstral coefficients using a bank of MEL filters providing what is referred to as MEL cepstra. Thus, for example, MEL cepstra is computed over 25 ms frames with a 10 ms overlap, in combination with deriving first and second finite derivatives, typically referred to as the delta and delta-delta parameters of the speech. Other types of optional acoustic features that may be extracted by the acoustic front end include a running average pitch, a running pitch variance, pitch jitter, running energy variance, speech rate, shimmer, fundamental frequency, and variation in fundamental frequency. Pitch jitter is the number of sign changes of the first derivative of pitch. Shimmer is energy jitter.

These optional acoustic features may be supplied from the acoustic front end to the classifier. The aforementioned acoustic features, including the MEL cepstra are, essentially, raw, unprocessed features.

Figure 2:
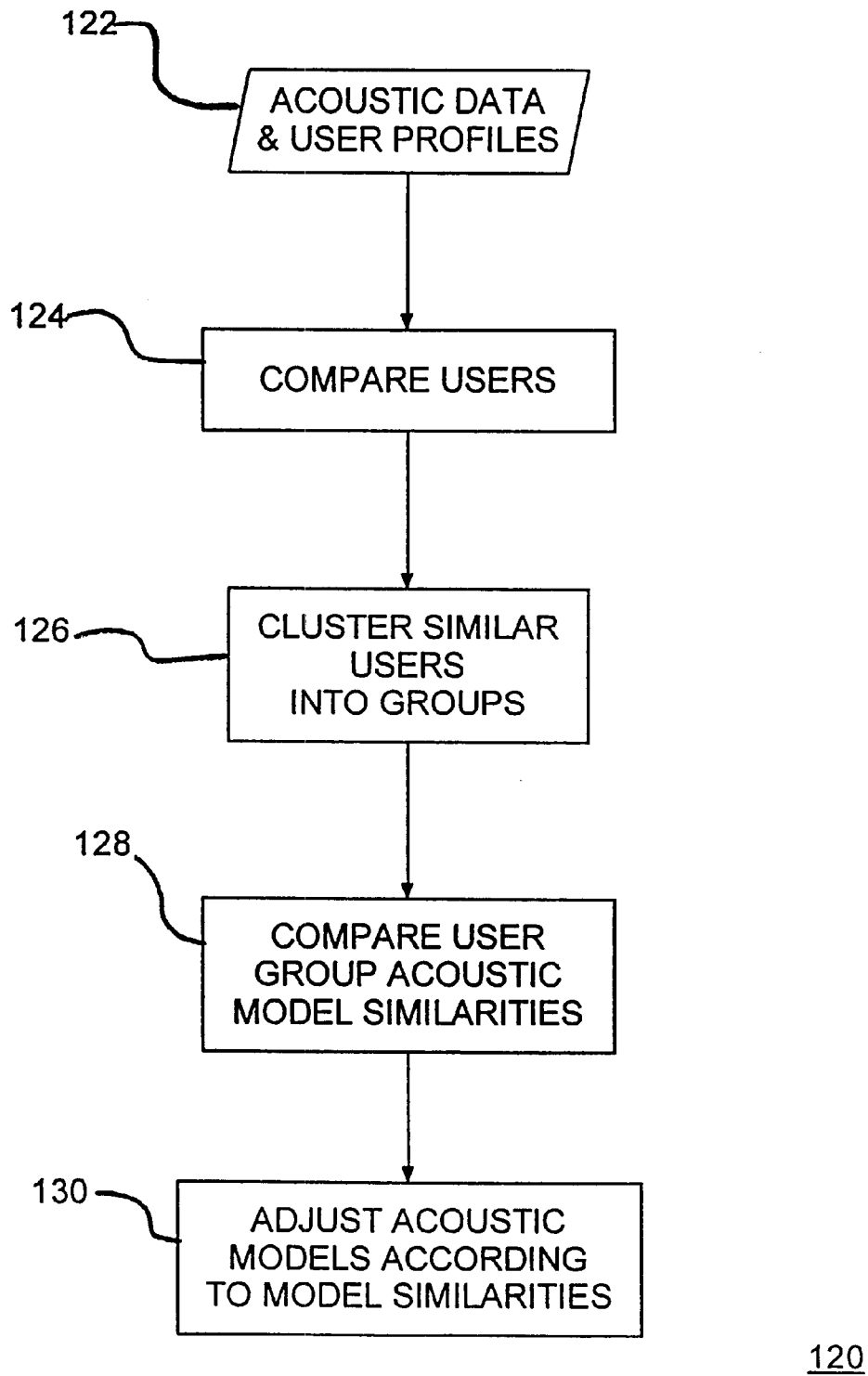
FIG. 2 is a flow chart of the preferred embodiment speech recognition process operating over the network of FIG. 1.

User queries are transcribed by an IVR, for example, and speech features are first processed by a text-independent speaker classification system according to the preferred speaker clusterer and classifier 120 of FIG. 2 which shows a flow chart of the preferred embodiment speech recognition process 120 operating over the network 100 of FIG. 1. This permits classification of the speakers based on acoustic similarities of their voices. Systems and methods of classifying users according to voice similarities is taught in U.S. patent application Ser. No. 08/787,031, filed Jan. 28, 1997 entitled "Speaker Recognition Using Thresholded Speaker Class Model Selection or Model Adaptation" to Ittycheriah, et al. now issued as U.S. Pat. No. 5,895,447, U.S. patent application Ser. No. 08/788,471, filed Jan. 28, 1997 entitled "Text Independent Speaker Recognition for Transparent Command Ambiguity Resolution and Continuous Access Control" and U.S. patent application Ser. No. 08/787,029, filed Jan. 28, 1997 entitled "Speaker Model Prefetching" both to Stephane Maes, all three assigned to the assignee of the present invention and incorporated herein by reference.

Different user acoustic models are clustered into classes according to acoustic similarities of the users, thereby clustering the speakers based on vocal and verbal similarities. First, in step 122, acoustic profile data for individual users previously accumulated and stored in the local databases are passed over the network 100 to the server 106. The user acoustic data are compared in step 124 in the server 106. In step 126, based on that comparison, users are clustered into classes of similar users according to acoustic voice similarities. Then, in step 128, different acoustic models (i.e., different domains) are compared in sets associated with similar users, to derive cluster update data. Finally, in step 130, acoustic model components for similar users are modified relative to user production activities. As each individual acoustic model is changed, similar acoustic models from different user sets located elsewhere on the network also are modified in the server 106. At appropriate times, such as upon user request, modified acoustic models are transmitted from the server 106 to other sites on the network 100. So, acoustic model components, including data about users and information about user activities, are thereby synchronized in all similar acoustic models across the network.

Figure 3:
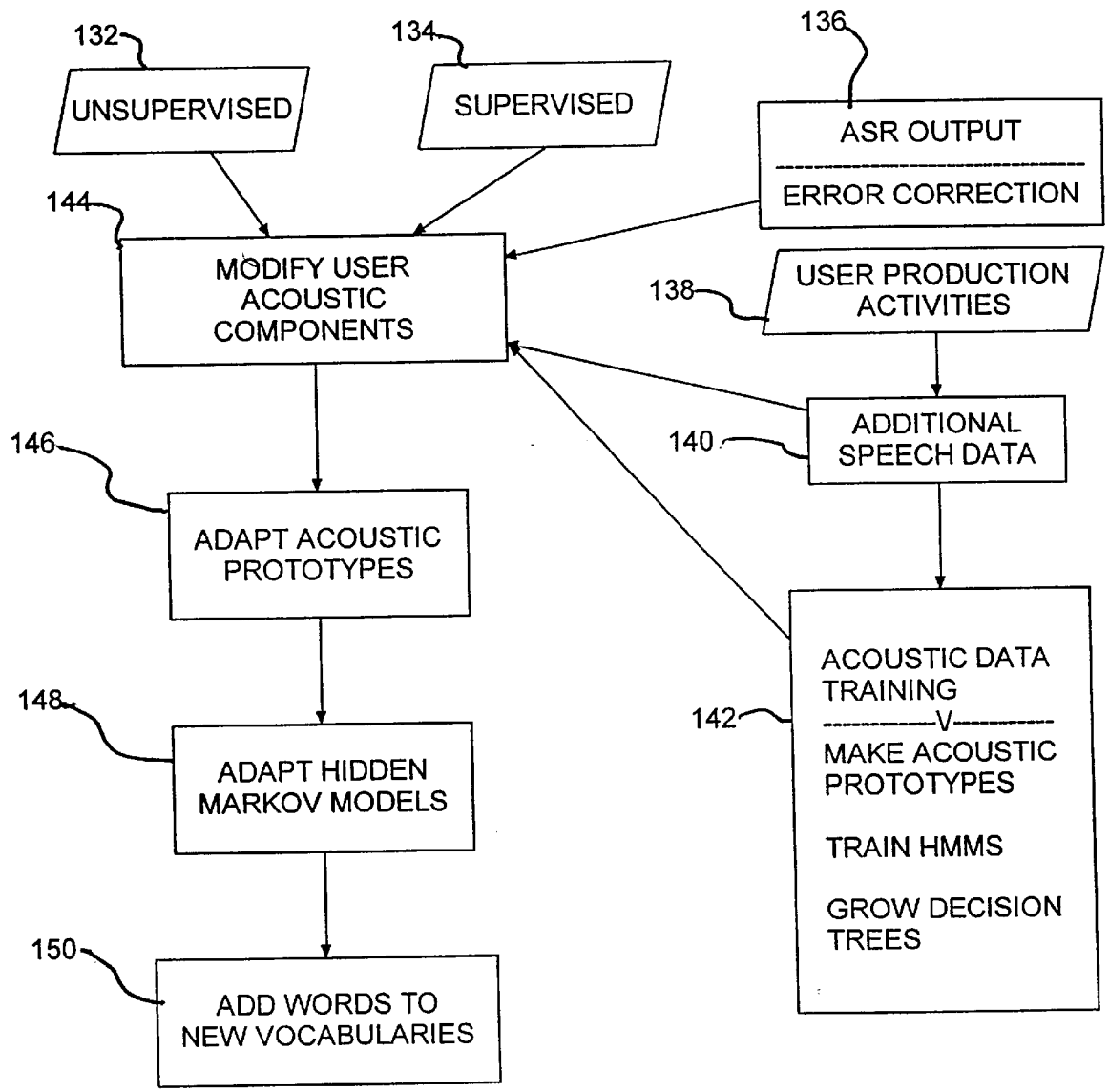
FIG. 3 is a flowchart showing how one or more acoustic models are changed.

FIG. 3 is a flowchart showing how one or more acoustic models are modified in step 130. The input changes to the model may be supervised input 134 or unsupervised input 132, the output of automatic speech recognition 136 or the result of user production activities 138 as described in detail hereinbelow with reference to FIG. 4. Further, the result of the user production activities 138 may be additional speech data (i.e., data collected from other speech related tasks such as speaker identification, speech recording, etc.) 140 or acoustic training data 142.

Acoustic training data 142 is generated at each initial use by a new user. Acoustic training data 142 includes, for example, acoustic prototypes, or Hidden Markov Models. Alternately, acoustic training data 142 may be employed for growing acoustic decision trees, each decision tree being based on the user's speech training data. Furthermore, acoustic training 142 may include estimating parameters that control the decoding process, estimating parameters that control signal processing and compiling a code book of user speech data. Parameters that control the decoding process may include, but are not limited to, weights of decoding score mixtures, decision thresholds that control decoding stacks, phone or word durations, decoding alternative list sizes, decoding tree sizes.

After receiving all acoustic input data, user acoustic model components are modified in step 144. Then, in step 146, acoustic prototypes are adapted for any additional or subsequent speech data produced by a user. In step 148, HMM parameters are adapted incrementally to additional user speech data. Finally, in step 150, new words are added to the acoustic vocabulary and new queries are added to acoustic decision trees. Additionally, adding new words in step 150 may entail modifying acoustic ranks, as well as adapting relative weights of language models and acoustic models.

Figure 4:
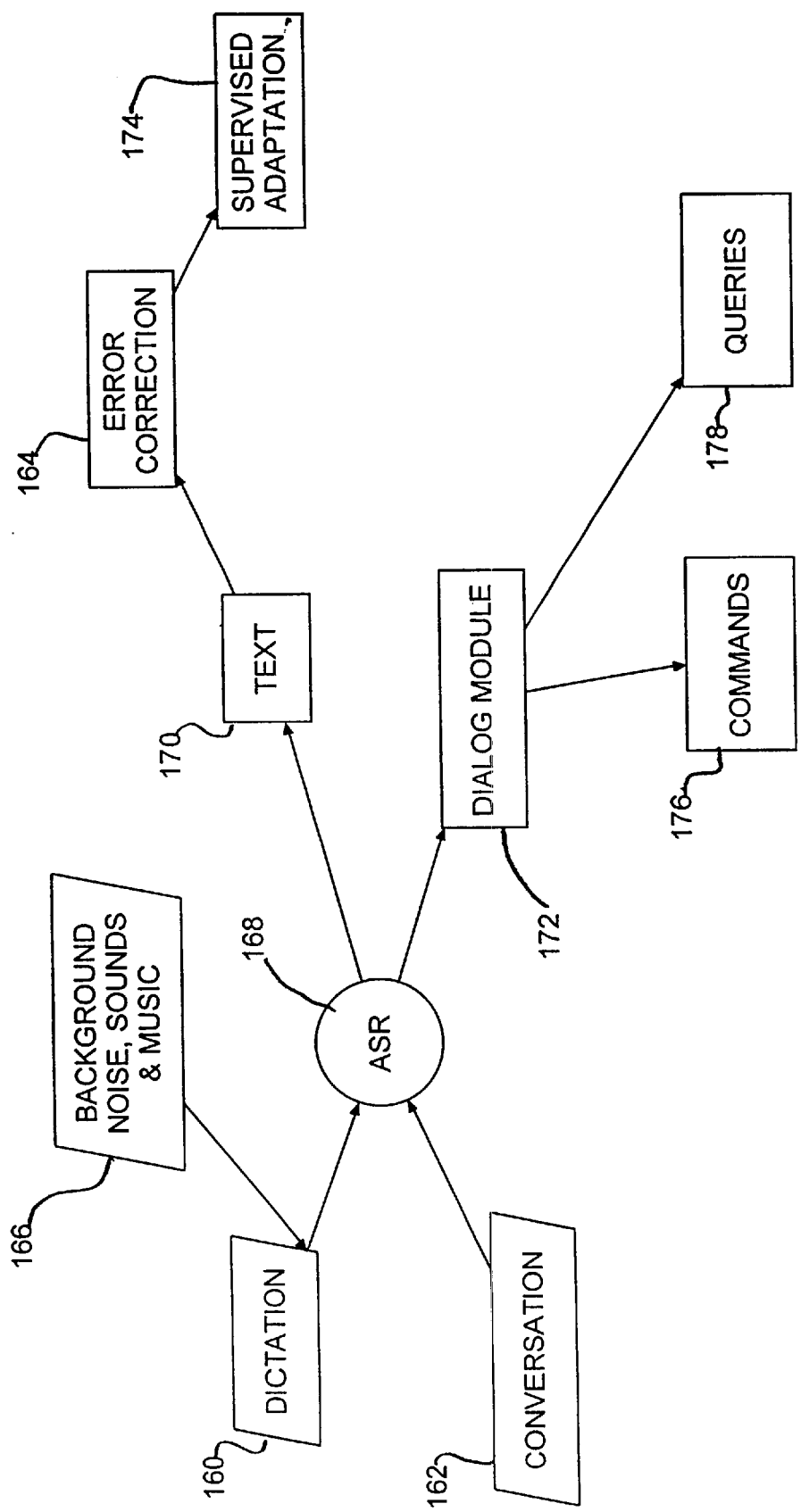
FIG. 4 is an illustration of user actions and user production activities.

FIG. 4 is an illustration of user actions and user production activities. User production activities may include activities such as dictation 160, conversation 162, error correction 164, generation of sounds 166 including noise and music. So, dictation 160, conversation 164 and background audio 166 are provided to automatic speech recognition module 168. The automatic speech recognition module 168 generates either text 170 or passes the recognition results to dialog module 172. Error correction 164 operates on the text 170, correcting any recognition errors, providing a supervised adaptation 174 of the input. The dialog module 172 generates system commands 176 and queries 178 in response to recognition results passed to it.

Figure 5:
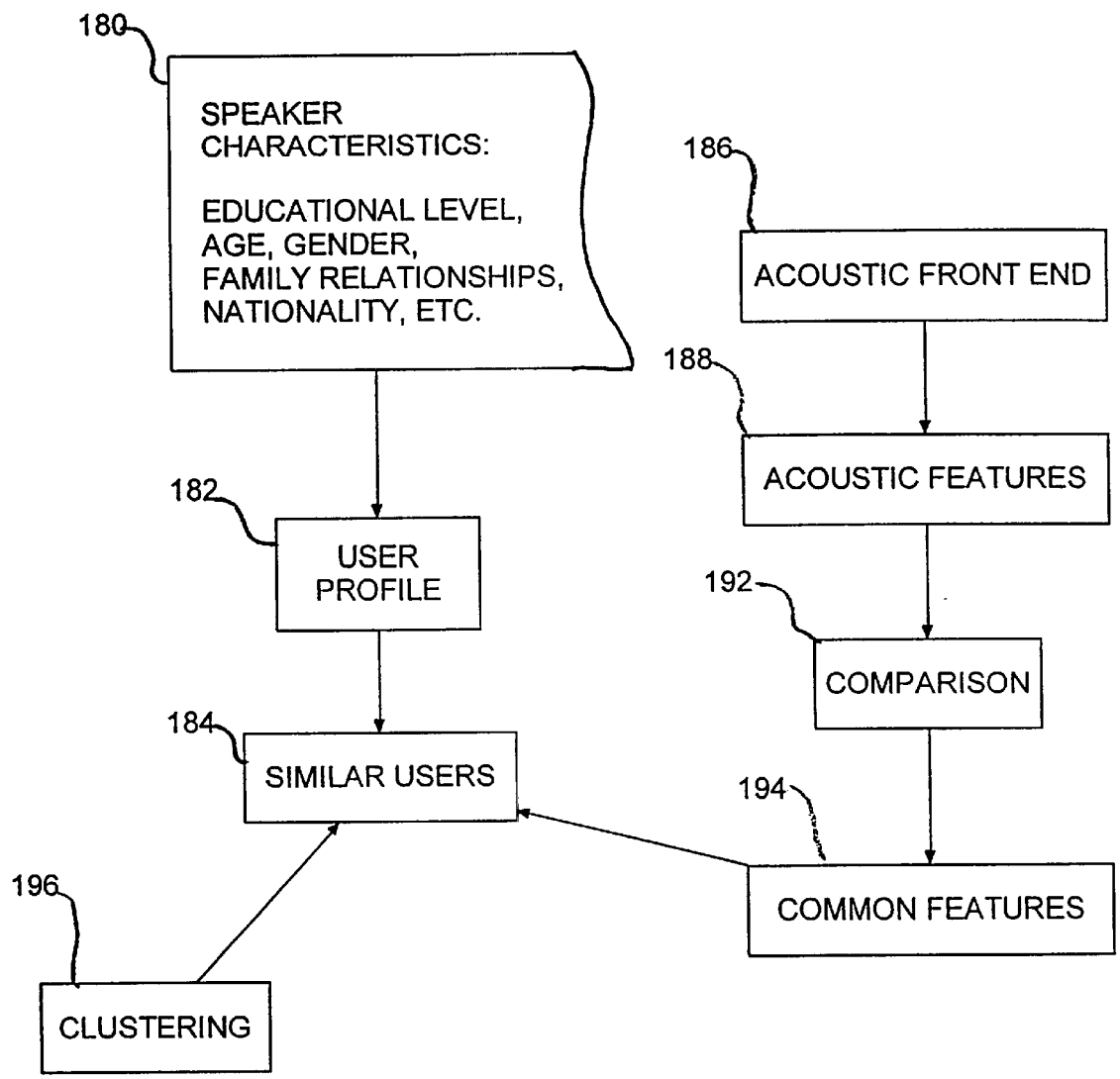
FIG. 5 is a flow diagram of the user clustering step.

FIG. 5 is a flow diagram of the user clustering step 126 in FIG. 1. First, in step 180, the user's speaker characteristics, including but not limited to the user's educational level, age, gender, family relationship and nationality are gathered and provided as a user profile in step 182. Network data for all users including user profiles are compared to identify similar users in step 184. Independently, in step 186 an acoustic front end produces acoustic features, e.g., as the result of training. In step 188, corresponding acoustic features are identified in the speaker's voice. As noted above acoustic features may include, for example, accent, vocal tract characteristics, voice source characteristics, fundamental frequency, running average pitch, running pitch variance, pitch jitter, running energy variance, speech rate, shimmer, fundamental frequency, variation in fundamental frequency and MEL cepstra. Then, in step 192, acoustic features collected from various users are compared. Acoustic models from the same domain but from different sets or systems are compared in step 192. Common features are identified in step 194 and passed to step 184 to identify similar users. Similar users identified in step 184 are users that have one or more common characteristics or, one or more common acoustic features. In step 196, user clusters are identified to cluster users with one or several common features, with several similar acoustic components or with similar profile characteristics, thereby classifying such users in the same classes. Additionally, thereafter, user characteristics are recorded, collected and used for further user classification.

Figure 6:
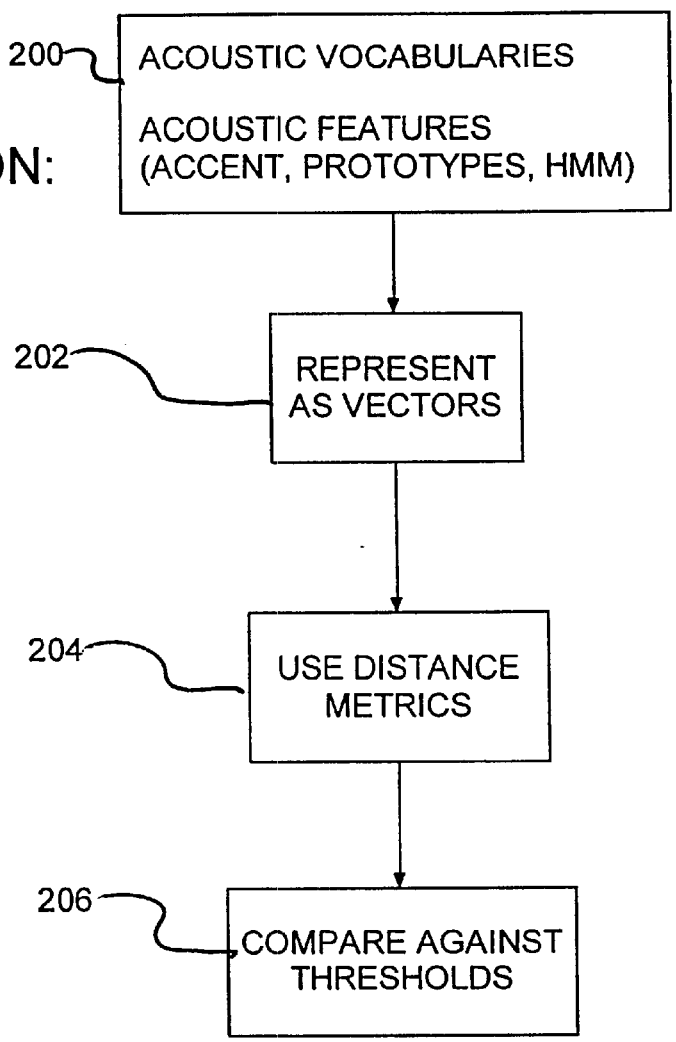
FIG. 6 is a flow chart of the acoustic component comparison step.

FIG. 6 is a flow chart of the acoustic component comparison step 192 of FIG. 5. In step 200 acoustic vocabularies and features are provided and represented as vectors in step 202. In step 204, the distance, preferably the Euclidean distance between vectors is calculated. Alternately the Kulback distance may be calculated. In step 206, the computed distances are compared against threshold values to identify similar models, similar models being defined as having calculated values that fall below the threshold values. Acoustic user vocabularies, acoustic features, acoustic user components, acoustic prototypes, Hidden Markov Models for words and phones and accent vectors are compared to determine similarities. Also, acoustic vocabularies of similar users may be analyzed to update the user acoustic vocabulary.

Figure 7:
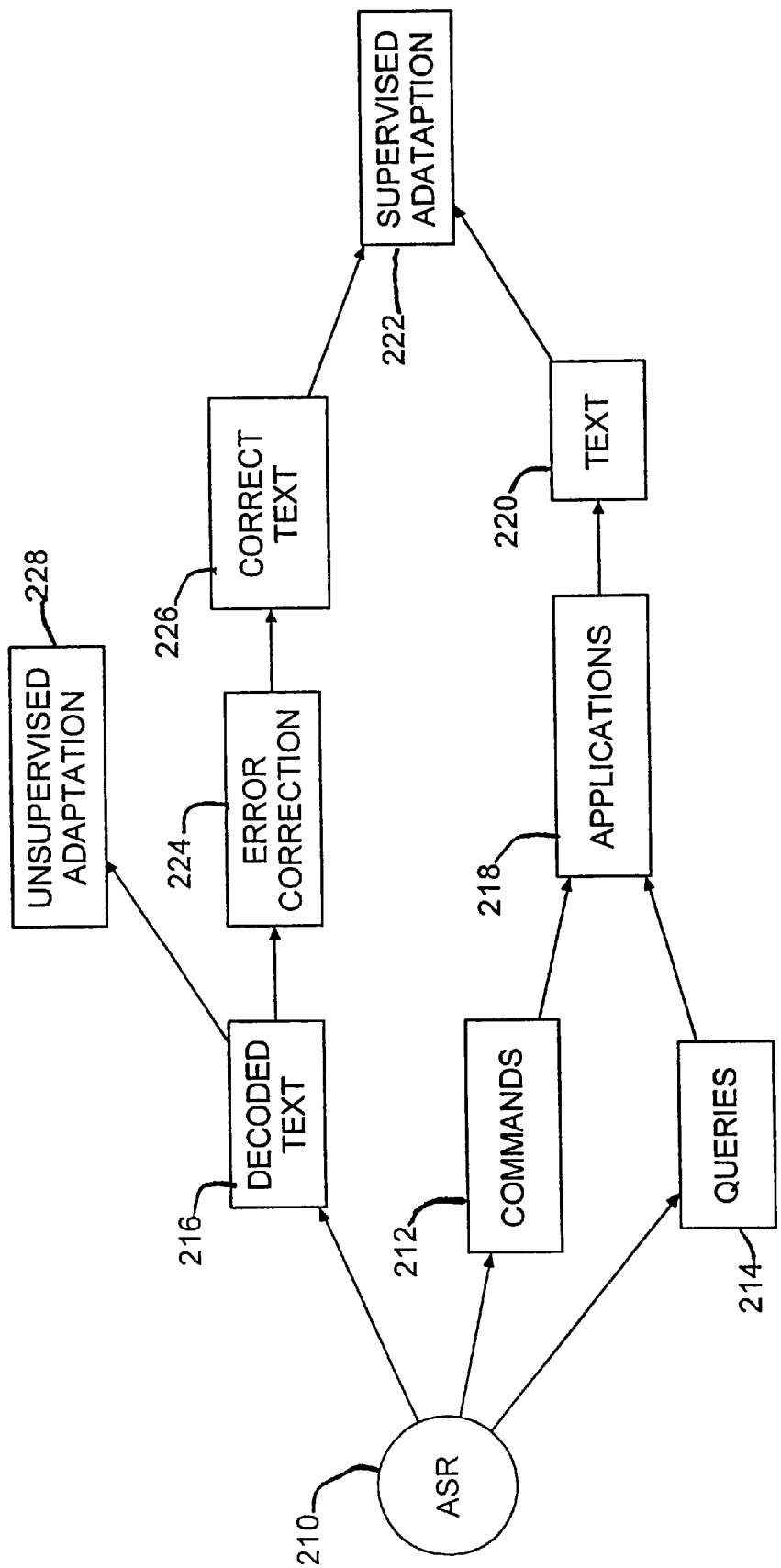
FIG. 7 is a flowchart illustrating supervised and unsupervised speech adaptation according to the preferred embodiment of the present invention.
Figure 1:
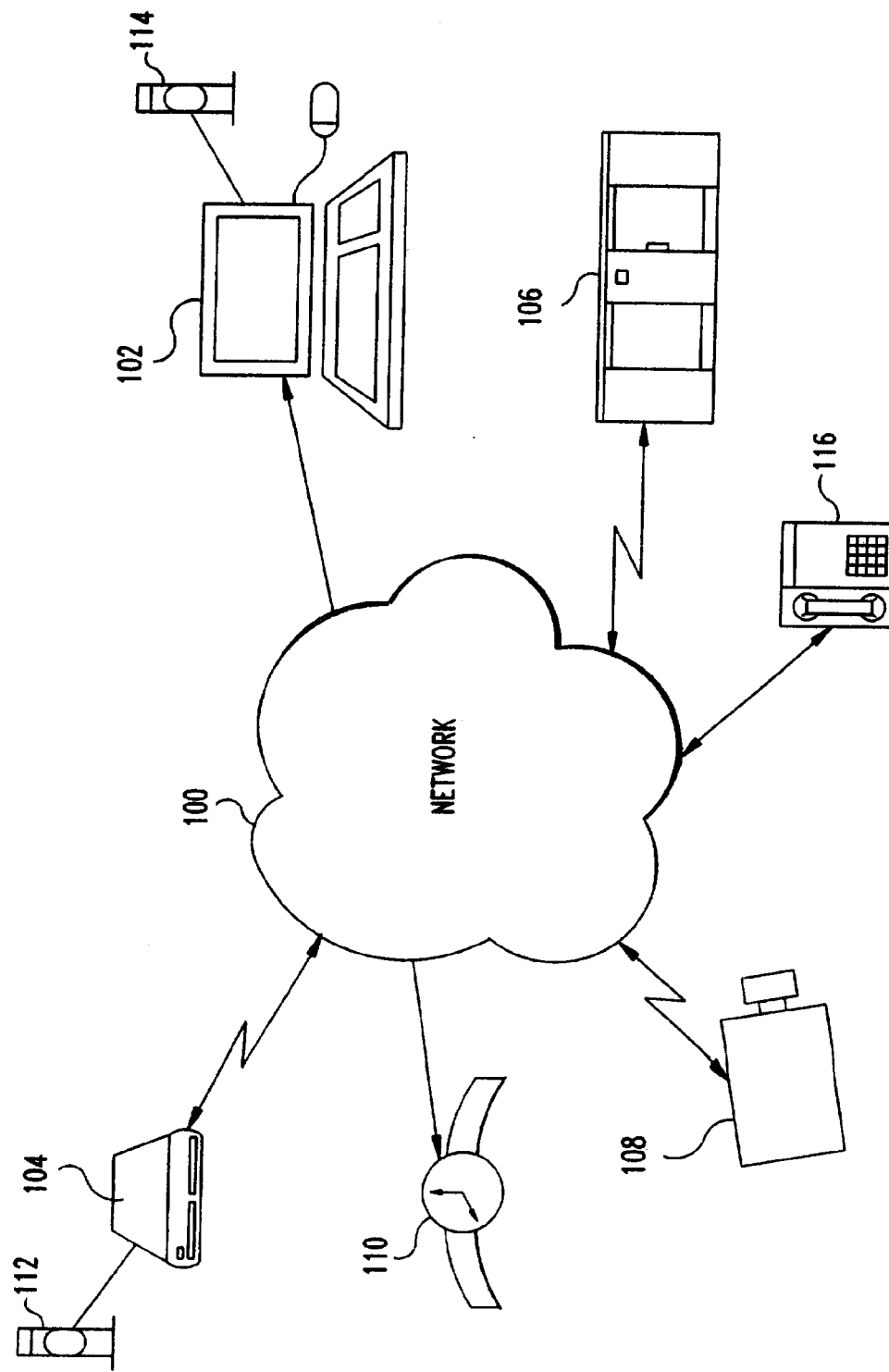
Figure 2:
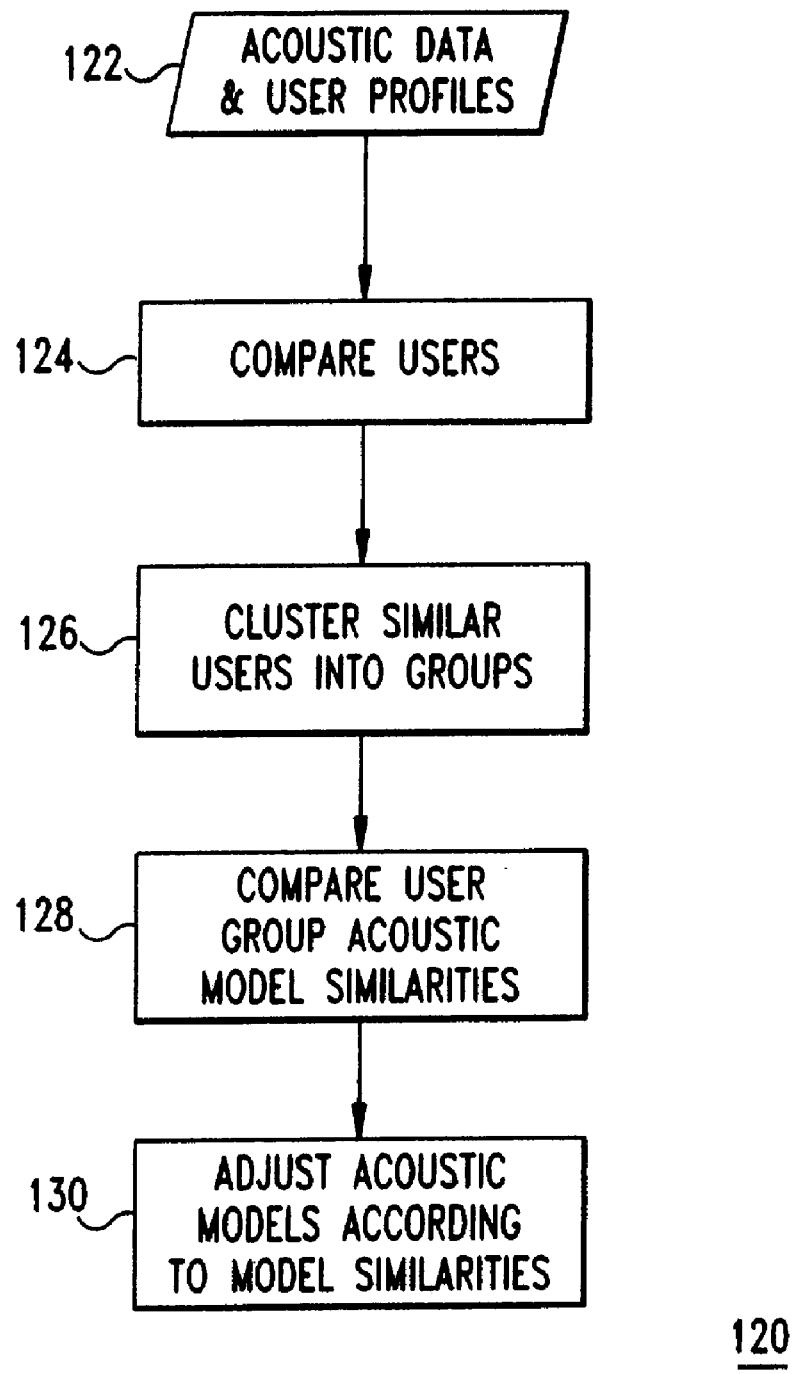
Figure 3:
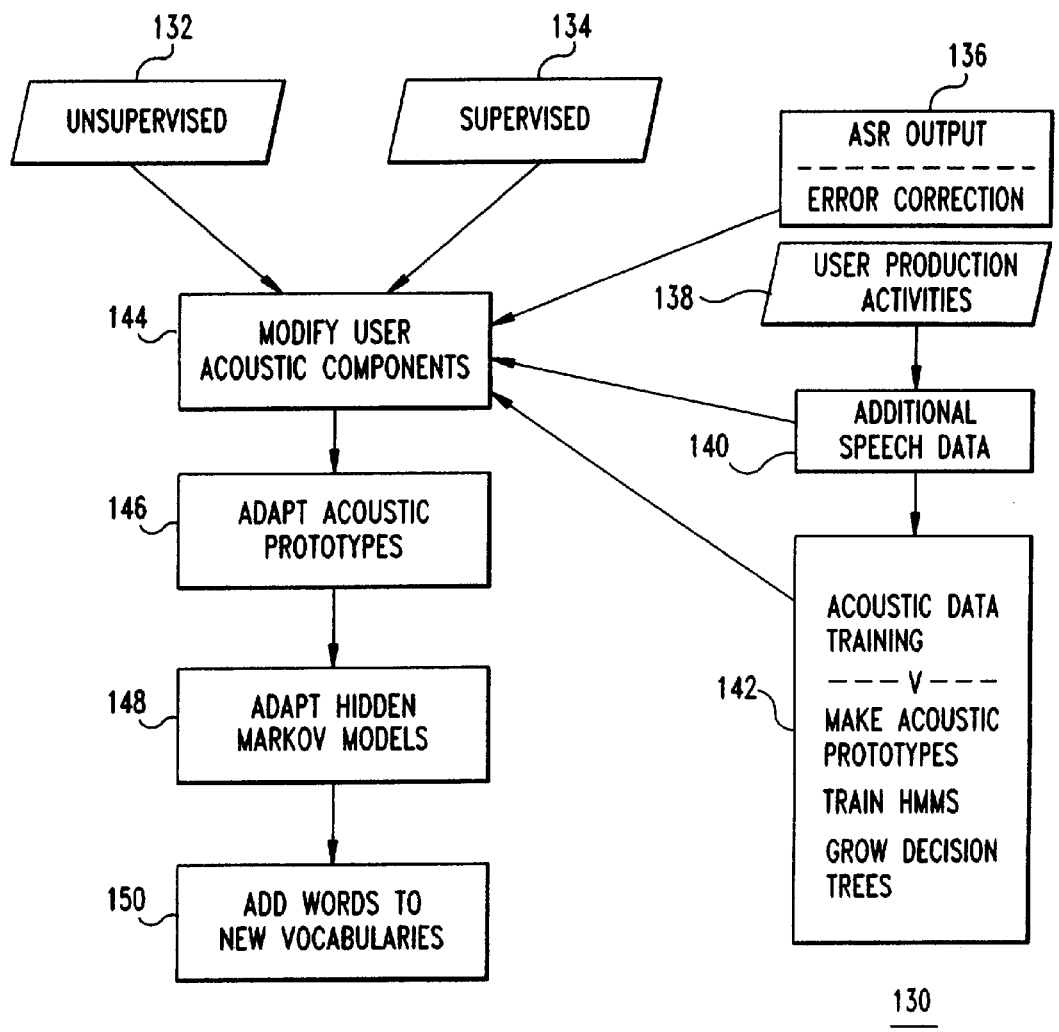
Figure 5:
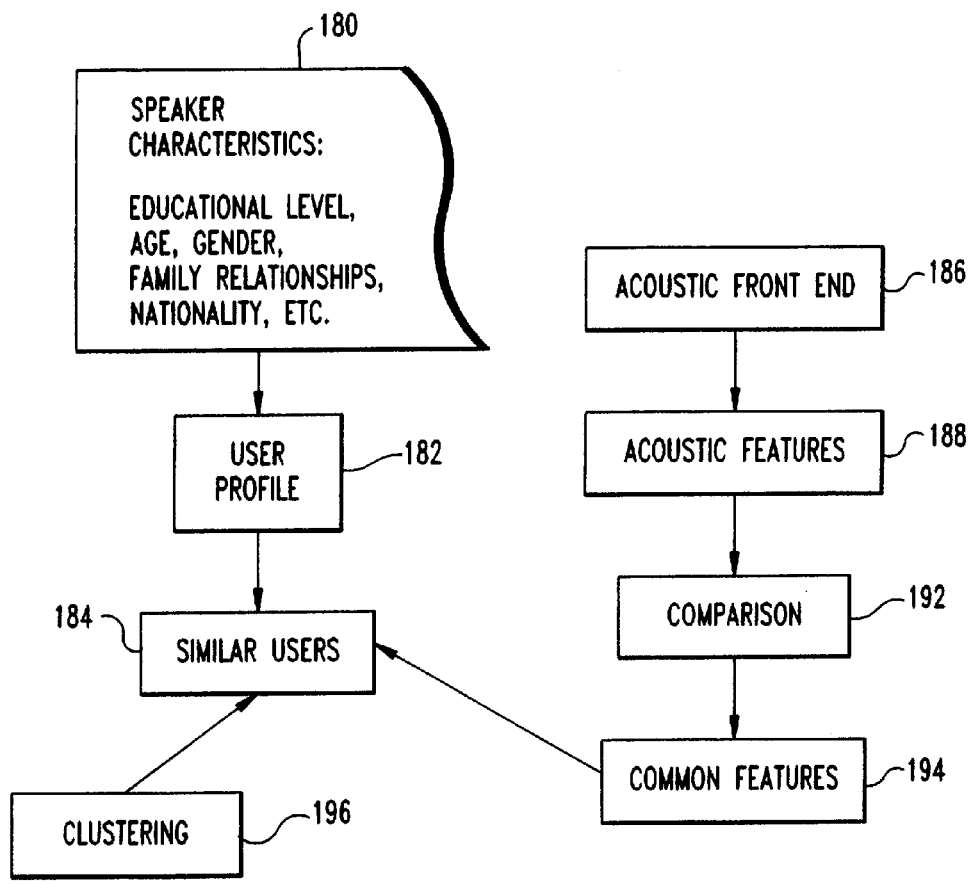
Figure 6:
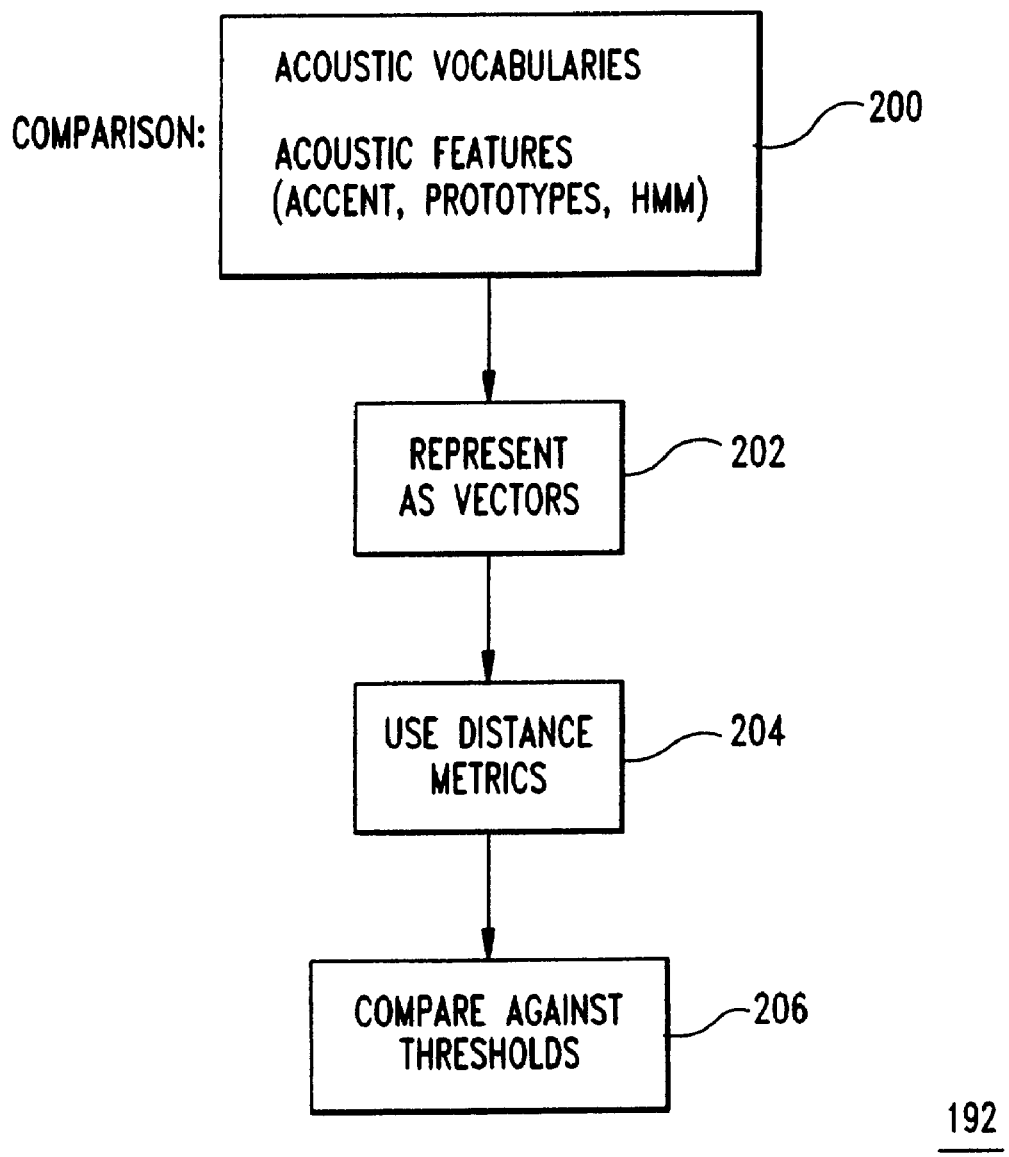
Figure 7:
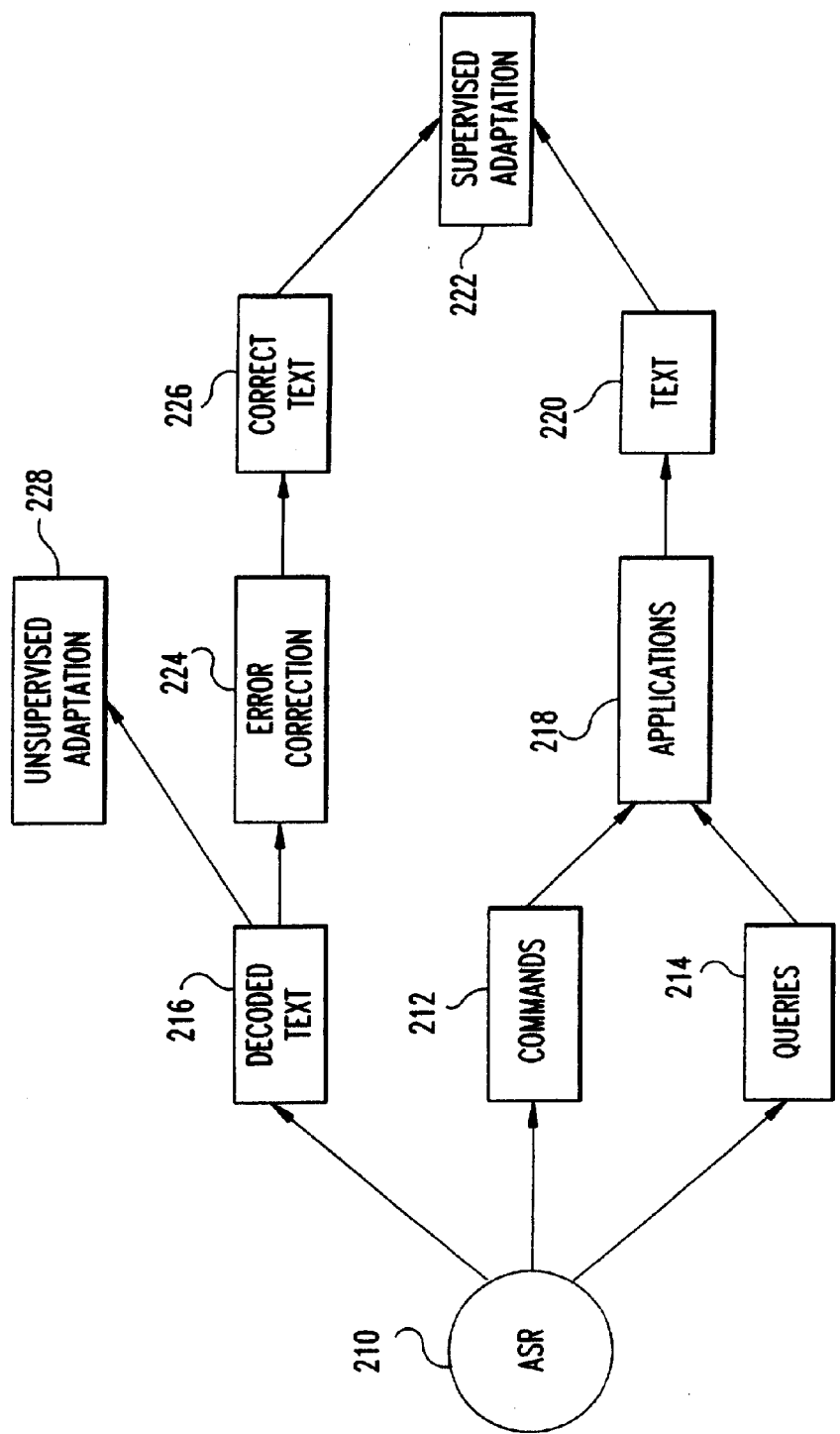

FIG. 7 is a flowchart illustrating supervised and unsupervised speech adaptation according to the preferred embodiment of the present invention, further illustrating aspects of the invention not shown in FIG. 4. Automatic speech recognition module 210 receives speech and, depending on the content of the user's speech, provides commands 212, queries 214 or uncorrected decoded textual data 216. Commands 212 and queries 214 are passed directly to one or more applications 218 and/or to the operating system. Commands 212 may direct an application operation, e.g., "open file . . . ," "close," "indent," or, when passed to the operating system, may direct window navigation. Queries 214 are passed to appropriate applications 218, e.g., queries 214 are passed to a database manager for database searching.

Further, Commands 212 and queries 214 that are passed to applications 218 elicit a textual output. The textual output is passed to a supervisor 222 for approval. The text may be, for example, used for transmission as e-mail; a decoded document for storage after some period of time that signifies supervisor approval; a decoded document that was corrected; or, a newly decoded document. For supervised applications, uncorrected decoded textual data 216 is corrected in step 224 and passed to the supervisor 222 as corrected text 226. For unsupervised recognition, the decoded textual data 216 is provided directly for unsupervised adaptation 228. Accordingly, the decoded textual data 216 is either uncorrected textual data, unexecuted commands or unissued queries.

While the invention has been described in terms of preferred embodiments, those skilled in the art will recognize that the invention can be practiced with modification within the spirit and scope of the appended claims.

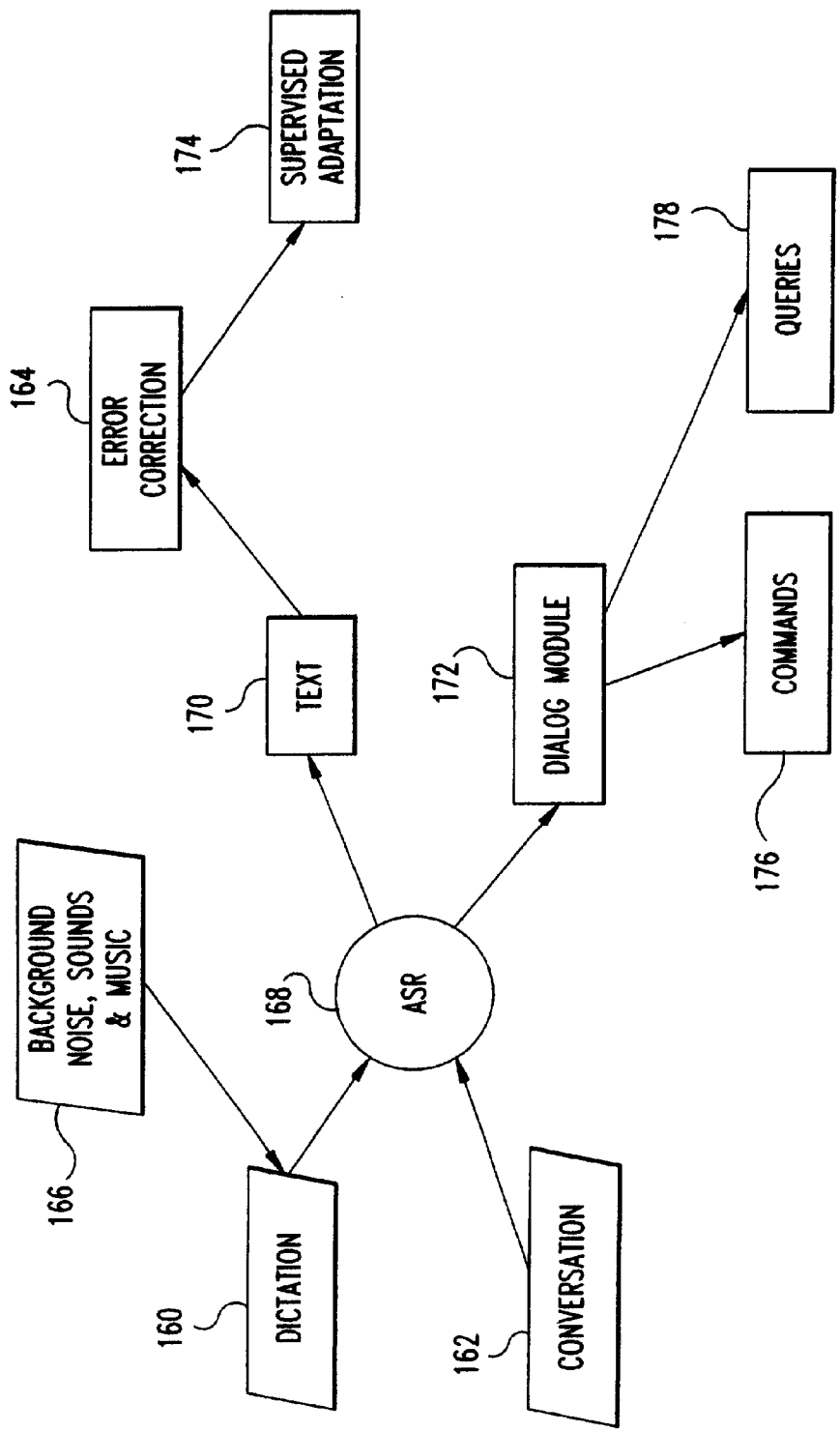

We claim:

1. A speech recognition system for recognizing speech input from computer users connected together over a network of computers, a plurality of said computers each including at least one acoustic model trained for a particular user, said system comprising:

means for comparing acoustic models of one or more computer users, each of said computer users using one of a plurality of computers;

means for clustering users on a network of said plurality of computers into clusters of similar users responsive to said comparison of acoustic models;

means for modifying each of said acoustic models responsive to user production activities;

means for comparing identified similar acoustic models and, responsive to modification of one or more of said acoustic models, modifying one or more compared said identified similar acoustic models; and means for transmitting acoustic model data over said network to other computers connected to said network.

2. A speech recognition system as in claim 1, wherein the means for comparing acoustic models further comprises:

means for identifying an acoustic model domain, similar acoustic models being clustered according to said identified domain.

3. A speech recognition system as in claim 2, wherein the means for identifying said acoustic model domain comprises means for identifying a domain selected from the group of domains consisting of a telephone speech domain, a speaker independent speech domain, a gender related speech domain, an age related speech domain, a broadcasting speech domain, a noise mixed with speech domain, a music mixed with speech domain, a discrete speech domain and a continuous speech domain.

4. A speech recognition system as in claim 2, further comprising:

means for converting speech input from a user into an acoustic model.

5. A speech recognition system as in claim 4, wherein the means for converting speech into an acoustic model being selected from the group consisting of:

means for converting speech into an acoustic prototype;

means for converting speech into a Hidden Markov Model (HMM) for words;

means for converting speech into a HMM for phones;

means for converting speech into an acoustic rank;

means for converting speech into an acoustic decision tree;

means for converting speech into a weighted mixture of decoding scores;

means for converting speech into a decoding stack threshold;

means for converting speech into a phone duration;

means for converting speech into a word duration;

means for converting speech into a decoding alternative list size; and means for converting speech into a plurality of signal processing control parameters.

6. A speech recognition system as in claim 2, further comprising means for receiving user production activities, said means for receiving user production activities being capable of receiving activity selected from the group consisting of dictation, conversation, error correction, sound generation, noise generation and music generation.

7. A speech recognition system as in claim 6, further comprising means for identifying and issuing commands, queries and text from said received user production activities.

8. A speech recognition system as in claim 7, further comprising:

means for converting said commands and queries into textual data; and means for providing said text and said converted textual data to a supervisor.

9. A speech recognition system as in claim 2, further comprising:

means for maintaining a plurality of user profiles; and means for extracting acoustic features.

10. A speech recognition system as in claim 9, wherein the means for maintaining a plurality of user profiles is a server.

11. A speech recognition system as in claim 9, wherein the means for extracting acoustic features comprises:

means for extracting acoustic features selected from the group of features consisting of accent, vocal tract characteristics, voice source characteristics, fundamental frequency, running average pitch, running pitch variance, pitch jitter, running energy variance, speech rate, shimmer, fundamental frequency, variation in fundamental frequency and MEL cepstra.

12. A speech recognition system as in claim 1, wherein the means for comparing acoustic models comprises means for measuring the distance between acoustic model components, acoustic models having components separated by less than a threshold being identified as similar.

13. A speech recognition system as in claim 2, wherein the plurality of computers comprises:

at least one server;

at least one personal computer; and at least one embedded device.

14. A speech recognition system as in claim 13, wherein at least one embedded device includes at least one personal digital assistant.

15. A speech recognition method for recognizing speech from each of a plurality of computer users, said method comprising the steps of:
  a) clustering computer users coupled together over a network of connected computers into classes of similar users, at least one acoustic model being maintained on a corresponding one of said connected computers for each of said computer users;
  b) for each of said classes, identifying similar acoustic models being used by clustered users;
  c) modifying one user acoustic model responsive to user production activities by a corresponding clustered user;
  d) comparing and adapting all said identified similar acoustic models responsive to modification of said one user acoustic model; and
  e) transmitting user data over said network, said transmitted user data including information about user activities and user acoustic model data.

16. A speech recognition method as in claim 15, wherein each said acoustic model is directed to one of a plurality of speech domains, said plurality of speech domains comprising:
  a telephone speech domain;
  a speaker independent speech domain;
  a gender related speech domain;
  an age related speech domain;
  a broadcasting speech domain;
  a speech mixed with noise domain;
  a speech mixed with music domain;
  a discrete speech domain; and
  a continuous speech domain.

17. A speech recognition method as in claim 15, wherein the step (a) of clustering users comprises comparing acoustic profile data for connected said users.

18. A speech recognition method as in claim 17 wherein said comparison is supervised, said users being classed into a plurality of established classes. identifying users having common speaker domains.

19. A speech recognition method as in claim 17 wherein said acoustic profile data includes user sex, age and nationality.

20. A speech recognition method as in claim 16, wherein the step (d) of comparing user acoustic models, similar users are identified as users having models with features falling within a specified threshold of each other.

21. A computer program product for recognizing speech from each of a plurality of computer users, said computer users using computers coupled together over a network, said computer program product comprising a computer usable medium having computer readable program code thereon, said computer readable program code comprising:

computer readable program code means for clustering computer users coupled together over a network of connected computers into classes of similar users, at least one acoustic model being maintained on a corresponding one of said connected computers for each of said computer users;
  computer readable program code means for identifying similar acoustic models being used by clustered users for each of said classes;
  computer readable program code means for modifying one user acoustic model responsive to user production activities by a corresponding clustered user;
  computer readable program code means for comparing and adapting all said identified similar acoustic models responsive to modification of said one user acoustic model; and
  computer readable program code means for transmitting user data over said network, said transmitted user data including information about user activities and user acoustic model data.

22. A computer program product as in claim 21, wherein each said acoustic model is directed to one of a plurality of speech domains, said plurality of speech domains comprising:
  a telephone speech domain;
  a speaker independent speech domain;
  a gender related speech domain;
  an age related speech domain;
  a broadcasting speech domain;
  a speech mixed with noise domain;
  a speech mixed with music domain;
  a discrete speech domain; and
  a continuous speech domain.

23. A computer program product as in claim 21, wherein the computer readable code means for clustering users comprises computer readable code means for comparing acoustic profile data for connected said users.

24. A computer program product as in claim 23 wherein said comparison is supervised, said users being classed into a plurality of established classes, identifying users having common speaker domains.

25. A computer program product as in claim 23, wherein said acoustic profile data includes user sex, age and nationality.

26. A computer program product as in claim 22, wherein the computer readable code means for comparing individual user acoustic models, compares similar users having models with features falling within a specified threshold of each other.

* * * * *

UNITED STATES PATENT AND TRADEMARK OFFICE
CERTIFICATE OF CORRECTION

PATENT NO.   : 6,442,519 B1
DATED        : August 27, 2002
INVENTOR(S)  : Kanevsky et al.

It is certified that error appears in the above-identified patent and that said Letters Patent is hereby corrected as shown below:

<u>Drawings,</u>
In the Figures please replace sheets 1 - 7 (Figures 1 - 7) with the attached seven (7) pages of Formal Drawings, Figures 1 - 7.

Signed and Sealed this

Eleventh Day of February, 2003

JAMES E. ROGAN
*Director of the United States Patent and Trademark Office*